US007520190B2

(12) United States Patent
Hasegawa et al.

(10) Patent No.: US 7,520,190 B2
(45) Date of Patent: Apr. 21, 2009

(54) STRUCTURE OF ENGINE STARTER EQUIPPED WITH PLANETARY GEAR SPEED REDUCER

(75) Inventors: Youichi Hasegawa, Kasugai (JP); Sadayoshi Kajino, Nagoya (JP); Hisato Inoue, Anjo (JP)

(73) Assignee: Denso Corporation, Kariya (JP)

( * ) Notice: Subject to any disclaimer, the term of this patent is extended or adjusted under 35 U.S.C. 154(b) by 457 days.

(21) Appl. No.: 11/304,764

(22) Filed: Dec. 16, 2005

(65) Prior Publication Data

US 2006/0130600 A1 Jun. 22, 2006

(51) Int. Cl.
*F02N 15/02* (2006.01)
*F16F 1/34* (2006.01)

(52) U.S. Cl. ........................................ 74/7 E; 267/161

(58) Field of Classification Search ....................... 74/6, 74/7 R, 7 A, 7 B, 7 C, 7 D, 7 E, 8; 384/126, 384/127, 240, 243, 303; 475/331; 267/158-163
See application file for complete search history.

(56) References Cited

U.S. PATENT DOCUMENTS 2,706,491 A * 4/1955 Kohler ....................... 137/540
5,857,380 A 1/1999 Kajino et al.
6,286,378 B1 * 9/2001 Kamei et al. .................. 74/7 A
2005/0193840 A1 9/2005 Murase et al.

FOREIGN PATENT DOCUMENTS

JP 58-214668 12/1983
JP A-UM-S58-180379 12/1983
JP A-UM-S61-148932 9/1986
JP A-UM-S62-152075 9/1987
JP A-H09-310667 12/1997
JP 2005-240679 9/2005

* cited by examiner

*Primary Examiner*—Richard W L Ridley
*Assistant Examiner*—James Pilkington
(74) *Attorney, Agent, or Firm*—Oliff & Berridge PLC

(57) ABSTRACT

A starter for automotive engines is provided which is equipped with a planetary gear train working as a speed reducer. The starter also includes a partition plate and a thrust washer. The partition plate extends radially of the starter between an electric motor and a planetary gear train to isolate the planetary gear train from a motor chamber. The thrust washer extends radially of the starter in abutment with the partition plate so as to bear a thrust load, as transmitted from the planetary gear train. The thrust washer also includes an outer peripheral portion which is placed between a rear end surface of an internal gear of the planetary gear train and the front end surface of the partition plate and has an elastic mechanism working to elastically urge the internal gear of the planetary gear train frontward in the axial direction of the starter.

7 Claims, 4 Drawing Sheets

STRUCTURE OF ENGINE STARTER EQUIPPED WITH PLANETARY GEAR SPEED REDUCER

CROSS REFERENCE TO RELATED DOCUMENT

The present application claims the benefits of Japanese Patent Application No. 2004-364878 filed on Dec. 16, 2004, the disclosure of which is incorporated herein by reference.

BACKGROUND OF THE INVENTION

1. Technical Field of the Invention

The present invention relates generally to a starter which may be employed in starting an automotive engine, and more particularly to an improved structure of such a starter equipped with a planetary gear speed reducer working to reduce the speed of rotation of an electric motor and transmit it to an output shaft for cranking the engine.

2. Background Art

Japanese Patent First Publication No. 58-214668 discloses a typical engine starter equipped with a planetary gear train working as a speed reducer. The starter also includes a one-way clutch which has an outer in which support pins (also called planet gear pins) are installed to support planet gears of the planetary gear train rotatably and to which orbital motion of the planet gears is transmitted directly to transfer torque to an output shaft of the starter. The torque of the output shaft is transmitted to a pinion gear fitted on the output shaft slidably through a shift lever. The pinion gear is selectively brought into engagement with a ring gear to crank the engine. The starter further includes a partition plate and a thrust washer. The partition plate is disposed between the motor and the planetary gear train within a starter casing and extends in a radial direction of the starter casing. The thrust washer is of a typical flat shape and disposed between the planetary gear train and the partition plate.

After start-up of the engine, the pinion gear is returned backward through the shift lever along the output shaft and hits a wall provided on the output shaft. The impact arising from the hit is transmitted to the output shaft as a thrust load. The thrust load then acts on the planetary gear train through the one-way clutch (especially, a carrier of the clutch) and urges the planetary gear train (especially, the support pins and the planet gears) against the partition plate, which may result in wear of the partition plate. In order to avoid such wear, the thrust washer works to block direct transmission of the thrust load to the partition plate.

The thrust washer, however, undergoes rotational attraction arising from the rotation of the planet gears, thus resulting in mechanical noises. In order to eliminate such noises, a washer lock mechanism may be used, but it leads to a complicated structure of the starter. Engine vibrations usually cause an internal gear of the planetary gear train to vibrate in the axial direction of the starter. In order to absorb such vibrations of the internal gear, a wave washer or a rubber gasket may additionally be used between the internal gear and the partition plate, but it will result in an increase in total manufacturing cost of the starter.

SUMMARY OF THE INVENTION

It is therefore a principal object of the invention to avoid the disadvantages of the prior art.

It is another object of the invention to provide an improved simple structure of a starter designed to bear a thrust load transmitted from a planetary gear train to a partition plate and to ensure the stability of location of an internal gear of the planetary gear train.

According to one aspect of the invention, there is provided a starter which may be employed in starting an automotive engine. The starter comprises: (a) a casing having; (b) an electric motor disposed within a motor chamber defined in the casing, the motor having an output shaft projecting from an front end thereof; (c) a one-way clutch disposed frontward of the motor within the casing; (d) a planetary gear train disposed between the motor and the one-way clutch within the casing, the planetary gear train working as a speed reducer to reduce a speed of rotation of the output shaft of the motor to transmit torque of the output shaft to the one-way clutch; (e) a starter output shaft retained in the casing rotatably for outputting the torque of the output shaft of the motor, as transmitted through the one-way clutch; (f) a partition plate extending so as to traverse an axial direction of the starter between the motor and the planetary gear train within the casing to isolate the planetary gear train from the motor chamber; and (g) a thrust washer extending so as to traverse the axial direction of the starter between the partition plate and the planetary gear train in abutment with a front end surface of the partition plate so as to receive a thrust load, as transmitted from the planetary gear train. The thrust washer includes an outer peripheral portion. The peripheral portion is placed between a rear end surface of an internal gear of the planetary gear train and the front end surface of the partition plate and has an elastic mechanism working to elastically urge the internal gear of the planetary gear train frontward in the axial direction of the starter.

The thrust load is usually transmitted from the starter output shaft to the planetary gear train. The thrust washer works to bear such a thrust load, thereby minimizing wear of the partition plate and ensuring the stability of braking of the starter output shaft.

The thrust washer, as described above, extends so as to traverse the axial direction of the starter. The elastic mechanism works to urge the internal gear frontward, thereby ensuring the stability of location of the internal gear and minimizing the play thereof. The thrust washer may be implemented by a disc spring or alternatively of a shape, as illustrated in FIGS. 3 to 6.

In the preferred mode of the invention, the elastic mechanism of the thrust washer is implemented by a cut-out portion which is formed by cutting out a thickness of the outer peripheral portion and bent in a thickness-wise direction of the thrust washer. This results in a decrease in manufacturing cost of the starter.

The outer peripheral portion of the thrust washer has a rotation stopper which protrudes outwardly in a radius direction of the thrust washer and engages an inner peripheral wall of the casing. This holds the thrust washer from rotating, thus minimizing wear of the partition plate.

The rotation stopper of the thrust washer may be so formed as to extend from an end of the cut-out portion. This ensures the holding of the thrust washer without sacrificing the stability in urging the internal gear.

The internal gear has a rotation stopper protruding from an outer periphery thereof. The thrust washer having a rotation stopper protruding from the cut-out portion. The casing has formed therein a groove in which the rotation stoppers of the internal gear and the thrust washer are fitted.

The casing has formed therein a groove in which the rotation stopper of the thrust washer is fitted and urged under pressure by the partition plate in the axial direction of the starter.

The elastic mechanism of the thrust washer may alternatively be implemented by cut-out portions which are formed in the outer peripheral portion and bent in a thickness-wise direction of the thrust washer. The cut-out portions extend in a circumferential direction of the thrust washer and have inside edges extending along an imaginary circle having a diameter greater than or equal to a root diameter of the internal gear of the planetary gear train. This permits an area of the thrust washer other than the cut-out portions to be made flat, thus assuring the ability of bearing the thrust load as exerted from the rear end surface of the planetary gear train.

The thrust washer may include a center portion extending inwardly of the outer peripheral portion and necks extending at inside ends thereof outwardly from an outer periphery of the center portion. The cut-out portions may be made of tabs extending from outside ends of the necks in the circumferential direction of the thrust washer. This permits the cut-out portions to produce elastic pressure which act on a radial width of the internal gear effectively.

A gap is provided between the rear end surface of the internal gear of the planetary gear train and the front end surface of the partition plate. The gap is greater than a thickness of the cut-out portion which is identical with a thickness of the thrust washer, thereby enabling the cut-out portion(s) to be deformed elastically to provide a spring pressure to the internal gear.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
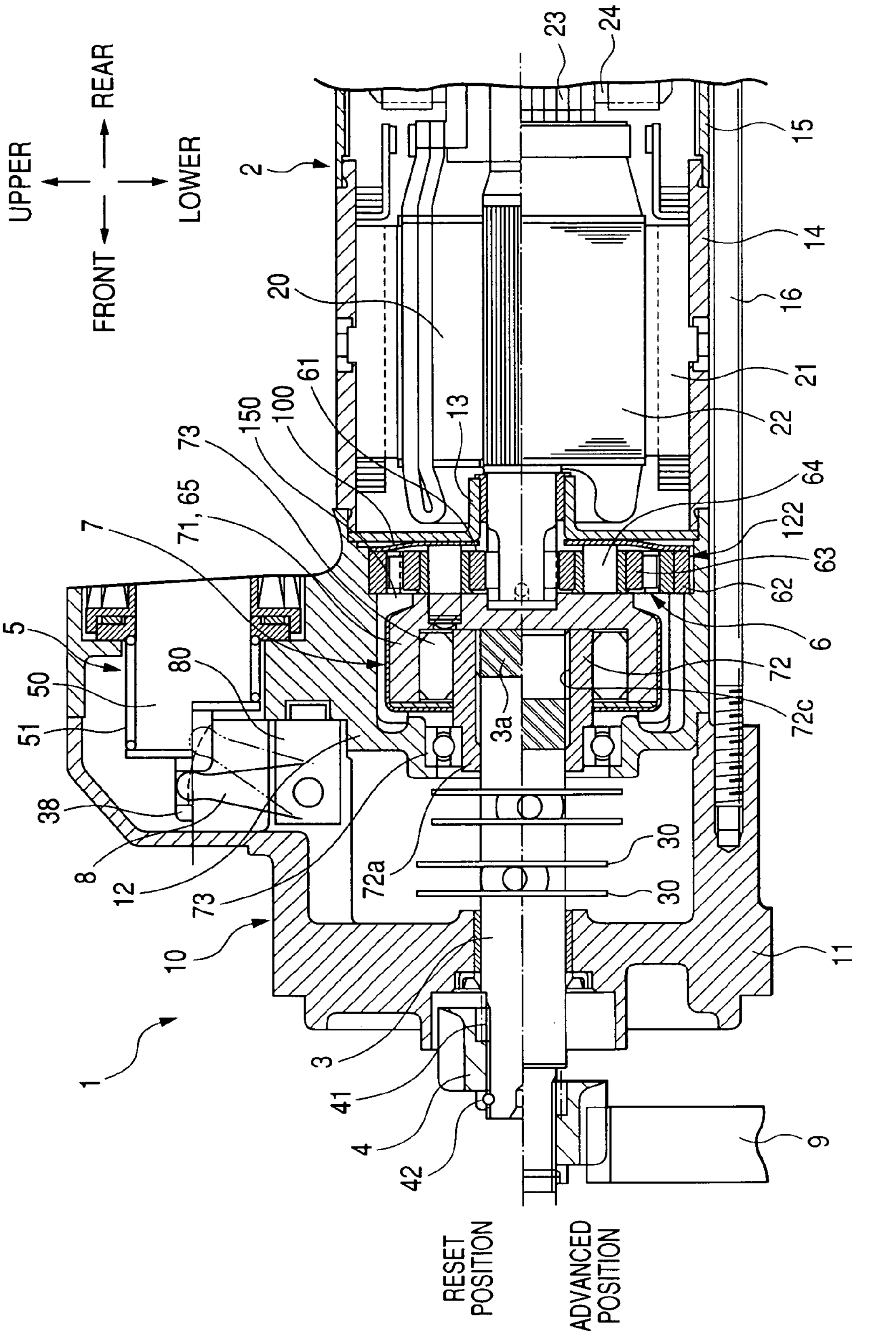
FIG. 1 is a longitudinal cross sectional view which shows an internal structure of a starter according to the present invention.

Referring to the drawings, wherein like reference numbers refer to like parts in several views, particularly to FIG. 1, there is shown a starter 1 according to the first embodiment of the invention which may be employed in starting an automotive engine.

The starter 1 consists essentially of a housing 10, an electric motor 2, an output shaft 3, a pinion gear 4, a magnet switch 5, a planetary gear train 6, a one-way clutch (also called an overrunning clutch) 7, a shift lever 8, and a circular partition plate 13. The pinion gear 4 is movable into engagement with a ring gear 9 connected to an engine (not shown). The partition plate 13 is made up of a hollow cylinder and a flange extending from an end of the cylinder.

The housing 10 serves as a starter casing and is made up of a cup-shaped front frame 11 having an open rear end, a center case 12, a hollow cylindrical yoke 14 with open ends, and a cup-shaped end frame 15 with an open rear end. These components are joined in alignment to define a length of the starter 1. The center case 12 has defined in an upper portion thereof a switch chamber with an open rear end within which the magnet switch 5 is disposed and in a lower portion thereof a torque transmission mechanism chamber 150 with an open rear end within which the planetary gear train 6 and the one-way clutch 7 are disposed. The yoke 14 and the end frame 15 have defined therein a motor chamber within which the motor 2 is disposed.

The front frame 11 and the end frame 15 are joined together by through-bolts 16 to retain the center case 12 and the yoke 14 therebetween in alignment. This holds the partition plate 13 between the center case 12 and the yoke 14 to block between the torque transmission mechanism chamber of the center case 12 and the motor chamber of the yoke 14.

Within the front frame 11, the shift lever 8 is disposed. Within the torque transmission mechanism chamber 150 of the center case 12, the planetary gear train 6 and the one-way clutch 7 are disposed. Within the switch chamber of the center case 12, the magnet switch 5 is disposed. Within the motor chamber defined by an assembly of the yoke 14 and the end frame 15, the motor 2 is disposed.

The motor 2 is a dc motor which includes an output shaft 20. The output shaft 20 is retained rotatably by the partition plate 13 and the end frame 15 through a bearing. The yoke 14 has a field winding 21 and an armature 22 disposed therein. The end frame 15 has a commutator 23 and brushes 24 disposed therein. The yoke 14 is made of a stationary iron member serving to form a part of a magnetic circuit of the motor 2. The armature 22 and the commutator 23 are fixed on the output shaft 20 of the motor 2. The output shaft 20 has an end or head extending through the partition plate 13 into the torque transmission mechanism chamber of the center case 12. The motor 2 is of the structure known in itself and explanation thereof in detail will be omitted here.

The planetary gear train 6 is disposed in the lower portion of the center case 12 in contact with the partition plate 13. The planetary gear train 6 serves as a speed reducer and is made up of a sun gear 61, a ring-shaped internal gear 62, planet gears 63, and a carrier 65. The sun gear 61 is formed on the end of the output shaft 20 of the motor 2. The internal gear 62 is retained fixedly by the center case 12. The planet gears 63 are placed in mesh with the gears 61 and 62. The carrier 65 bears the planet gears 63 through bearings fitted on support pins (also called planet gear pins) 64 installed in the planet gears 64. The planetary gear train 6 works to reduce a rotational speed of the output shaft 20 of the motor 2 to an orbital speed of the planet gears 63. Each of the planet gears 63 is retained rotataby by one of the support pins 64. The support pins 64 are press fit in the carrier 65. The carrier 65 also servers as a clutch outer 71, as will be described later in detail. The internal gear 62 has, as clearly illustrated in FIG. 2, formed on an outer periphery thereof ridges or protrusions 66 which are fitted in grooves 122, as clearly illustrated in FIGS. 2 and 5, formed in an inner peripheral wall of the center case 12 and serve as rotation stoppers to hold the internal gear 62 from rotating.

Figure 2:
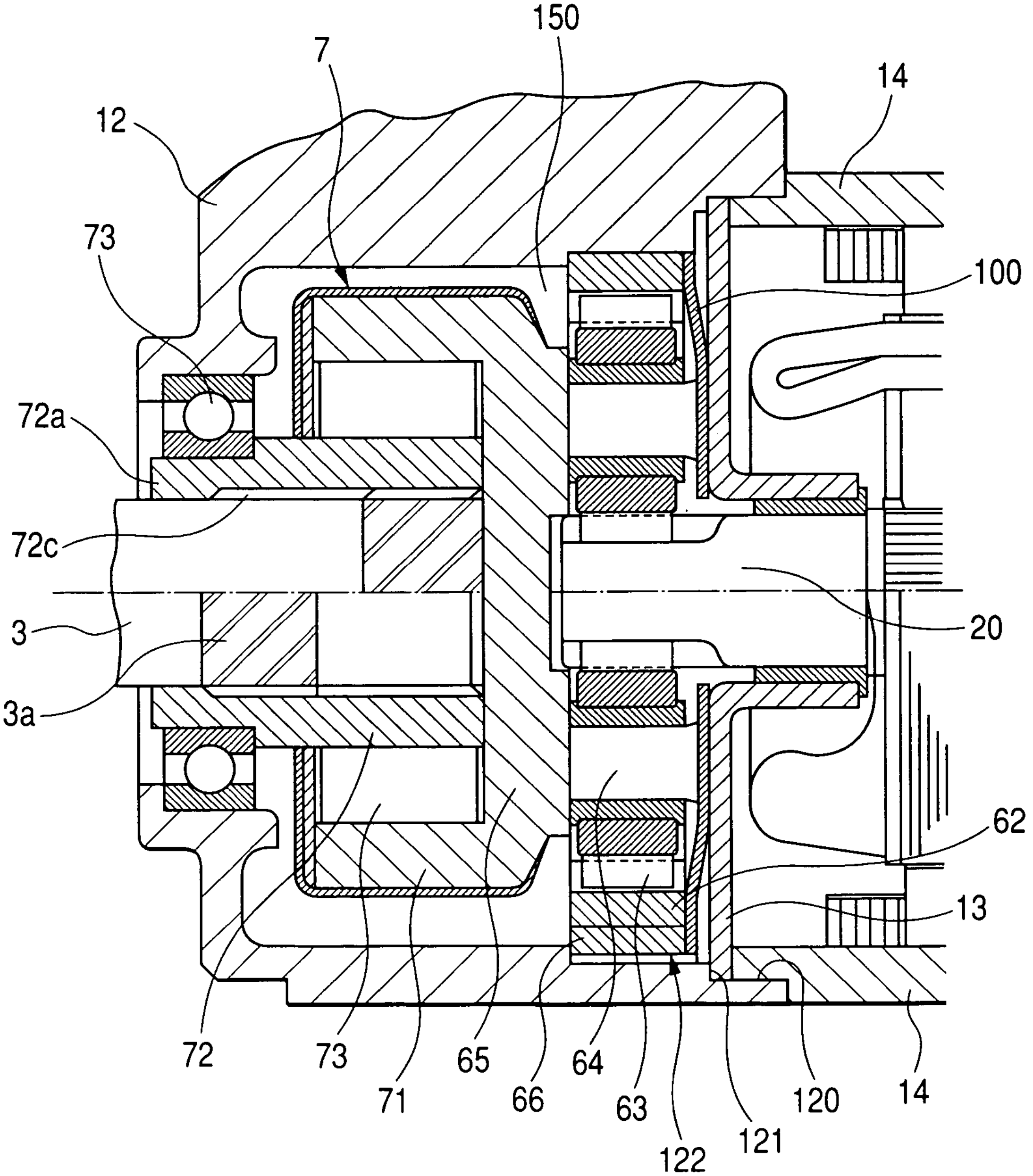
FIG. 2 is an enlarged partial sectional view, as taken along the line B-B in FIG. 5, which shows a thrust washer disposed between a planetary gear train and a partition plate of the starter of FIG. 1.

The one-way clutch 7 is, as clearly shown in FIG. 2, made up of an clutch outer 71, a cylindrical tube 72, and clutch rollers 73. The clutch outer 71 is formed integrally with the carrier 65 of the planetary gear train 6. The tube 72 defines a clutch inner which is disposed within the clutch outer 71. The clutch rollers 73 are disposed along with roller springs (not shown) within wedge-shaped cam chambers formed in an inner periphery of the clutch outer 71 and work to transmit the torque from the clutch outer 71 that is a driving clutch rotor to the tube 72 that is a driven clutch follower. The clutch outer 71 is of a cup-shape which has a chamber opening frontward and a bottom serving as the carrier 65. The clutch outer 71 has a thrust washer (not shown) installed on a surface thereof which faces a rear end of the output shaft 3 in alignment therewith. An air gap is formed between a rear end surface of the clutch outer 71 and a front end surface of the output shaft 20 of the motor 2 to block the transmission of a thrust load therebetween. The tube 72 has a bearing 72*a* formed on a protrusion thereof extending frontward. The bearing 72*a* is retained rotatably by the inner wall of the front end of the center case 12 through a ball bearing 73.

The output shaft 3 is disposed at a rear end thereof within the tube 72 in alignment with the output shaft 20 of the motor 2. The output shaft 3 is retained by the bearing 72*a* of the tube 72 to be movable in an axial direction of the starter 1. The output shaft 3 has formed on a rear end portion thereof an external helical spline 3*a* meshing with the internal helical spline 72*c* formed on an inner wall of the tube 72. The helical spline 72*c* extends from a rear end surface of the tube 72 to the bearing 72*a*. Specifically, the bearing 72*a* has no helical spline formed on an inner wall thereof, so that the front end of the helical spline 72*c* servers as a stopper to stop further travel of the output shaft 3 when moved toward the engine (i.e., the left in the drawing), and the external helical spline 3*a* hits the rear end of the bearing 72*a*. Another type of stopper may alternatively be provided at another location. The output shaft 3 is retained at the front end thereof rotatably and movably by the front frame 11 through a bearing.

The pinion gear 4 is jointed to the head of the output shaft 3 (i.e., a portion of the output shaft 3 projecting from the front frame 11) in a spline fashion to be rotatable in unison with the output shaft 3 and movable relative to the output shaft 3. The pinion gear 4 is also urged frontward (i.e., the left in FIG. 1) by a pinion spring 41 disposed between the pinion gear 4 and the output shaft 3 into abutment with a collar 42 installed on the tip of the output shaft 3.

The center case 12 isolates the magnet switch 5 physically from the one-way clutch 7 and the planetary gear train 6. The magnet switch 5 includes a coil 34 which is excited upon closing of a starter switch (not shown) of the vehicle, a plunger 50 slidable within the coil 34, and a return spring 51. The head of the plunger 50 projects into the front frame 11. When the coil 34 is energized by the starter switch, it will cause the plunger 50 to be attracted frontward (i.e., the rightward, as viewed in FIG. 1) against a spring pressure of the return spring 51 to advance the output shaft 3 through the shift lever 8. When the coil 34 is deenergized, it will cause the plunger 50 to be moved backward by the return spring 51 to return the output shaft 3 through the shift lever 8. The structure of the magnet switch 5 is of a typical one, and explanation thereof in detail will be omitted here.

The shift lever 8 is supported by a lever holder 80 to be swingable. The lever holder 80 is secured to the center case 12. The shift lever 8 has an upper portion, as viewed in FIG. 1, joined to a hook 38 retained by the plunger 50 and a lower portion nipped between a pair of washers 30 fitted on the output shaft 3, thereby transferring the movement of the plunger 50 to the output shaft 3.

In FIG. 1, an upper side above a longitudinal center line of the plunger 50 illustrates for the case where the magnet switch 5 (i.e., the coil 34) is deenegized, while a lower side illustrates for the case where the magnet switch 5 is energized.

In operation of the starter 1, when the starter switch is closed to energize the coil 34 of the magnet switch 5, it will cause the plunger 50 to be attracted backward to advance the output shaft 3 away from the motor 2 through the shift lever 8. When the pinion gear 4 on the output shaft 3 meshes with the ring gear 9 of the engine, a movable contact of the magnet switch 5 is brought into contact with a pair of fixed contacts of a driver circuit of the motor 2 to energize the motor 2, so that the armature 22 produces torque. Upon completion of the meshing of the pinion gear 4 with the ring gear 9, the torque of the pinion gear 4 is transmitted to the ring gear 9 to crank the engine.

After the start-up of the engine, the starter switch is opened to deenergize the coil 34 of the magnet switch 5. This causes the plunger 50 to be moved frontward or returned by the return spring 51. The movable contact of the magnet switch 5 are then moved out of contact with the fixed contacts of the motor drive circuit to cut the supply of power to the armature 22. Additionally, the frontward movement of the plunger 50 causes the output shaft 3 to be moved by the shift lever 8 toward the motor 2, so that the rear end of the output shaft 3 hits on the clutch outer 71 and stops.

The structure of the starter 1 features use of a thrust washer 100. The thrust washer 100 will be described below with reference to FIG. 2. FIG. 2 is an enlarged longitudinal sectional view which shows the torque transmission mechanism chamber 150 of the center case 12 within which the planetary gear train 6 and the one-way clutch 7 are disposed.

The front end of the yoke 14 is fitted into a rear opening of the torque transmission mechanism chamber 150.

The thrust washer 100 extends radially of the partition plate 13 (i.e., the housing 10 of the starter 1) in abutment with the front end surface of the partition plate 13. The thrust washer 100 has an outer periphery which is placed in abutment with the end surface of the internal gear 62 to exert an elastic pressure (i.e., a spring load) thereon in an axial direction of the starter 1. The center case 12 has a step or shoulder 121 defined by an annular groove 120 formed in the inner wall of the open rear end portion of the center case 12. The partition plate 13 is retained between the shoulder 121 of the center case 12 and the front end surface of the yoke 14 firmly by the pressure produced by fastening the through-bolts 16. The thrust washer 100 is in abutment at the front end surface thereof with the rear end surfaces of the internal gear 62 and the support pins 64 of the planetary gear train 6.

Figure 3:
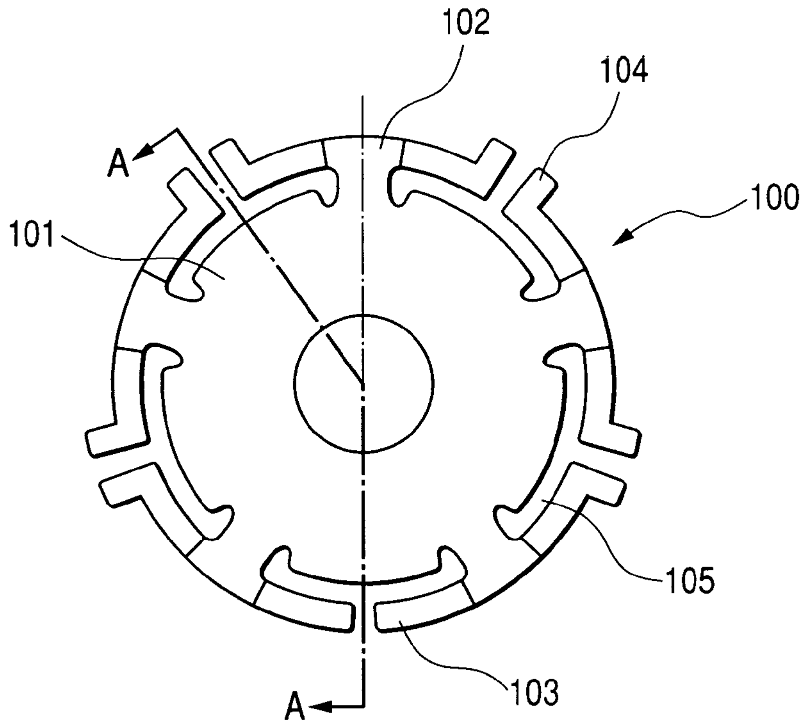
FIG. 3 is a plan view which shows the thrust washer, as illustrated in FIG. 2.
Figure 4:
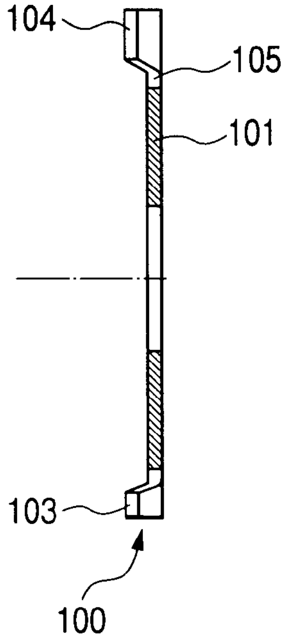
FIG. 4 is a sectional view taken along the line A-A in FIG. 3.
Figure 5:
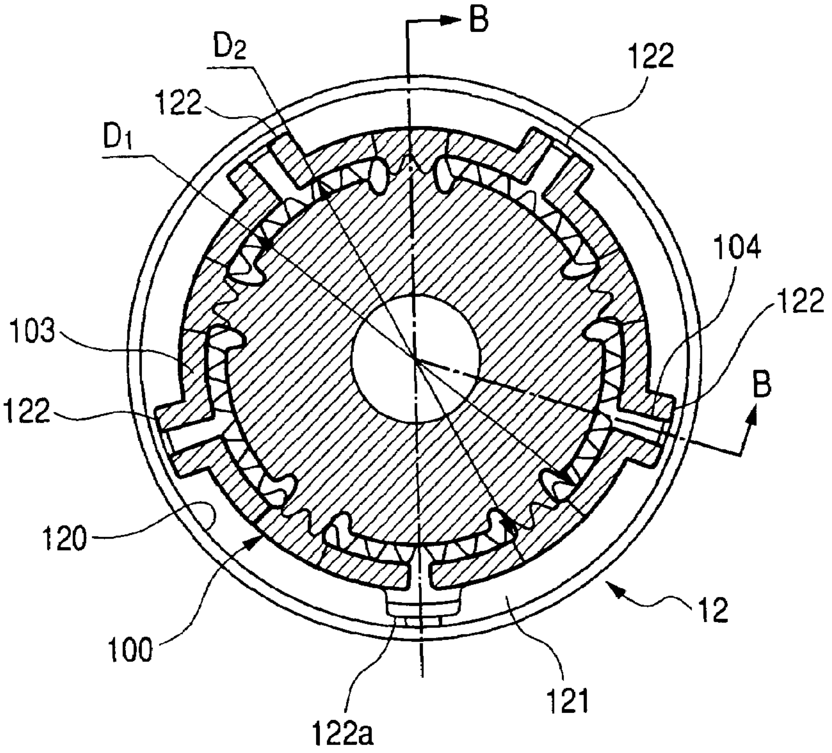
FIG. 5 is a transverse sectional view which shows a center case within which the thrust washer of FIG. 4 is disposed.

FIG. 2 shows the thrust washer 100 schematically for the brevity of illustration. The structure of the thrust washer 100 is illustrated in detail in FIGS. 3, 4, and 5. FIG. 3 shows the thrust washer 100, as viewed from the axial direction of the starter 1. FIG. 4 is a sectional view as taken along the line A-A of FIG. 3. FIG. 5 is a transverse sectional view which shows the center case 12 within which the thrust washer 100 is disposed. In FIG. 5, the thrust washer 100 is illustrated in cross section.

The thrust washer 100 is made of a wear-resistant disc of a circular shape as a whole and consists essentially of a ring-shaped center portion 101, five protrusions or necks 102, ten cutout tabs 103, and eight claws 104. The center portion 101 has a hole 109 formed in the center thereof. The necks 102 are arrayed at equi-angular intervals and extend radially from the outer periphery of the center portion 101. Two of the tabs 103 extend from each of the necks 102 in opposite directions along the circumference of the center portion 101. The claws 104 extend outwardly from the ends of eight of the tabs 103 in the radial direction of the thrust washer 100 and server as rotation stoppers. The thrust washer 100 has arc-shaped grooves 105 to define the outer periphery of the center portion 101 and the inside edges of the tabs 103. Each of the tabs 103 is bent, as illustrated in FIG. 4, frontward (i.e., toward the rear end surface of the internal gear 62) from a joint to the neck 102 in order to produce an elastic pressure or spring load acting on the internal gear 62 of the planetary gear train 6.

The thrust washer 100 is geometrically so shaped that when the thrust washer 100 is disposed between the partition plate 13 and the planetary gear train 6, the center portion 101 is placed in a nip formed by the support pins 64 of the planetary gear train 6 and the partition plate 13, and the tabs 103 are in direct contact with the rear end surface of the internal gear 62 to urge the internal gear 62 frontward elastically. The grooves 105, as clearly illustrated in FIG. 5, face rear end surfaces of teeth of the internal gear 62. The planet gears 63 are slidable in contact of the rear end surfaces thereof with the center portion 101 of the thrust washer 100.

The eight claws 104 are urged elastically against the rear end surface of the internal gear 62. The claws 104, as described above, serve as the rotation stoppers and are fitted together with the protrusions 66 of the internal gear 62 in the grooves 122 which are formed in the inner wall of the center case 12 deeper than the shoulder 121 to hold the thrust washer 100 from rotating. Four grooves are formed in the inner wall of the center case 12 at equi-angular intervals. Three of them are the grooves 122, and a remaining one is a groove **122*a* in which a protrusion formed on the periphery of the partition plate 13 is fitted to hold the partition plate 13 from rotating. The shoulder 121 is located deeper than the annular groove 120 which is machined in the inner peripheral wall of the center case 12 to open rearward. Adjacent two of the tabs 104 are fitted in each of the grooves 122, thereby also minimizing deformation of the thrust washer 100** in the radial direction thereof.

The overall thickness of the thrust washer 100 is constant and smaller than the gap between the rear end surface of the internal gear 62 and the front end surface of the partition plate 13. The tabs 103 are, as described above, bent frontward in the axial direction of the starter 1 to serve as elastic springs to urge the internal gear 62 elastically. The thrust washer 100, thus, works to receive and bear the backward thrust transmitted from the output shaft 3 to the support pins 64 of the planetary gear train 6 when the output shaft 3 is moved backward by the shift lever 8. This causes the friction between the support pins 64 and the thrust washer 100 to work to consume or absorb the energy of inertia rotation of the output shaft 3, thereby stopping the rotation of the output shaft 3 immediately.

The tabs 103, as clearly shown in FIG. 5, have inside edges which extend along an imaginary circle having a diameter $D_1$ greater than or equal to a root diameter $D_2$ of the internal gear 62 of the planetary gear train 6. This permits an area of the thrust washer 100 other than the tabs 103 to be made flat, thus assuring the ability of bearing the thrust load as exerted from the rear end surface of the planetary gear train 6.

Figure 6:
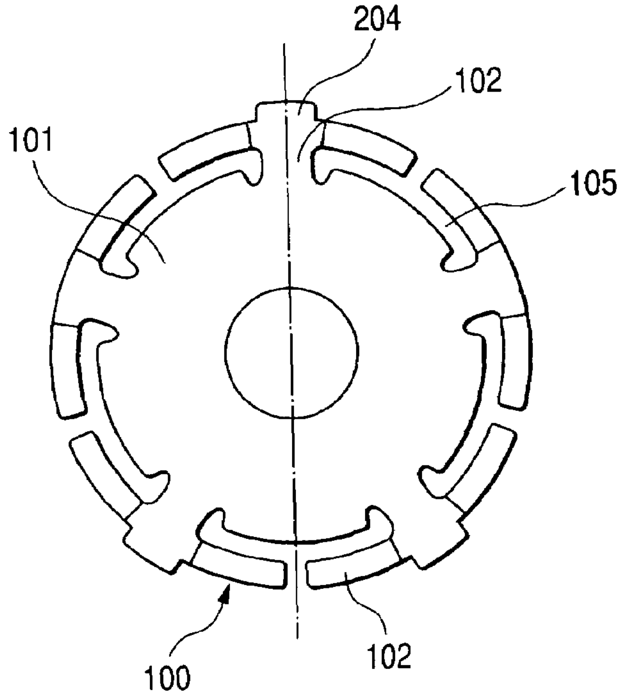
FIG. 6 is a plan view which shows a modification of the thrust washer of FIG. 4.

FIG. 6 shows a modification of the thrust washer 100.

The tabs 103 have no claws. Instead, protrusions claws 204 extend from three of the necks 102 radially of the thrust washer 100 and serve as rotation stoppers fitted firmly in the center case 12 to hold the thrust washer 100 from rotating.

As apparent from the above discussion, the thrust washer 100 is disposed on the front end surface of the partition plate 13 which isolates the motor chamber from the torque transmission mechanism chamber 150 of the center case 12. The thrust washer 100 works to receive the backward thrust of the output shaft 3 through the support pins 64 of the planetary gear train 6 and also urge the internal gear 62 elastically frontward. The thrust washer 100 is nipped at the center portion 101 between the partition plate 13 and the internal gear 62 and held by the engagement with the grooves 122 of the center case 12 from rotating and deforming in the radial direction thereof. This minimizes the wear of the partition plate 13 and ensures the stability of movement of the output shaft 3 and also eliminates the need for an elastic member required in the conventional structure to decrease the play of the internal gear 62. The elastically urging of the internal gear 62 against the center case 12 is achieved by spring loads produced by the tabs 103 bent frontward of the thrust washer 100. The tabs 103 are made by cutting out the thickness of the thrust washer 100 to form the grooves 105, thereby permitting the spring load to be created which acts on the internal gear 61 in the axial direction of the starter 1 in a simple manner. Further, the thrust washer 100 is held by the claws 104 (204) from rotating, thus avoiding the wear of the partition plate 13 arising from rotation thereof accompanying the rotation of the thrust washer 100 and improves the braking of the output shaft 3.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A starter comprising:

a casing having;

- an electric motor disposed within a motor chamber defined in said casing, said motor having an output shaft projecting from a front end thereof;
- a one-way clutch disposed frontward of said motor within said casing;
- a planetary gear train disposed between said motor and said one-way clutch within said casing, said planetary gear train working as a speed reducer to reduce a speed of rotation of the output shaft of said motor to transmit torque of the output shaft to said one-way clutch;
- an output shaft retained in said casing rotatably for outputting the torque of the output shaft of said motor, as transmitted through said one-way clutch;
- a partition plate extending so as to traverse an axial direction of the starter between said motor and said planetary gear train within said casing to isolate said planetary gear train from the motor chamber; and
- a thrust washer extending so as to traverse the axial direction of the starter between said partition plate and said planetary gear train in abutment with a front end surface of said partition plate so as to receive a thrust load, as transmitted from said planetary gear train, said thrust washer including an outer peripheral portion which is placed between a rear end surface of an internal gear of said planetary gear train and the front end surface of said partition plate and has an elastic mechanism working to elastically urge the internal gear of said planetary gear train frontward in the axial direction of the starter, wherein the elastic mechanism of said thrust washer is implemented by a cut-out portion which is formed by cutting out a thickness of the outer peripheral portion and bent in a thickness-wise direction of said thrust washer, and the outer peripheral portion of said thrust washer a rotation stopper which protrudes outwardly in a radius direction of said thrust washer and engages an inner peripheral wall of said casing.

2. A starter as set forth in claim 1, wherein the rotation stopper of said thrust washer extends from an end of the cut-out portion.

3. A starter as set forth in claim 1, wherein the internal gear has a rotation stopper protruding from an outer periphery thereof, said rotation stopper of the thrust washer protrudes from the cut-out portion, and wherein said casing has formed therein a groove in which the rotation stoppers of the internal gear and the thrust washer are fitted.

4. A starter as set forth in claim 1, wherein said casing has formed therein a groove in which the rotation stopper of said thrust washer is fitted and urged under pressure by said partition plate in the axial direction of the starter.

5. A starter as set forth in claim 1, wherein the cut-out portions comprises a plurality of cut-out portions extending in a circumferential direction of said thrust washer and having inside edges extending along an imaginary circle having a diameter greater than or equal to a root diameter of the internal gear of said planetary gear train.

6. A starter as set forth in claim 5, wherein said thrust washer includes a center portion extending inwardly of the outer peripheral portion and necks extending at inside ends thereof outwardly from an outer periphery of the center portion, and wherein the cut-out portions are made of tabs extending from outside ends of the necks in the circumferential direction of said thrust washer.

7. A starter as set forth in claim 1, wherein a gap is provided between the rear end surface of the internal gear of said planetary gear train and the front end surface of said partition plate, the gap being greater than a thickness of the cut-out portion which is identical with a thickness of said thrust washer.

* * * * *

UNITED STATES PATENT AND TRADEMARK OFFICE

CERTIFICATE OF CORRECTION

PATENT NO. : 7,520,190 B2
APPLICATION NO. : 11/304764
DATED : April 21, 2009
INVENTOR(S) : Youichi Hasegawa, Sadayoshi Kajino and Hisato Inoue It is certified that error appears in the above-identified patent and that said Letters Patent is hereby corrected as shown below:

ON THE COVER PAGE:

Between (65) and (51), please insert the following:

--Foreign Application Priority Data

Dec. 16, 2004 (JP)................. 2004-364878--

Signed and Sealed this

Sixteenth Day of June, 2009

JOHN DOLL
*Acting Director of the United States Patent and Trademark Office*